(12) United States Patent
Sun et al.

(10) Patent No.: US 8,344,702 B2
(45) Date of Patent: Jan. 1, 2013

(54) BATTERY HAVING UNIVERSAL SERIAL BUS PORT

(75) Inventors: Chia-Cheng Sun, Taipei Hsien (TW); Jin-Jye Chou, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 411 days.

(21) Appl. No.: 12/646,889

(22) Filed: Dec. 23, 2009

(65) Prior Publication Data

US 2011/0068750 A1 Mar. 24, 2011

(30) Foreign Application Priority Data

Sep. 23, 2009 (CN) .......................... 2009 1 0307505

(51) Int. Cl.
*H02J 7/06* (2006.01)
*H02J 7/24* (2006.01)

(52) U.S. Cl. ........................................................ 320/163
(58) Field of Classification Search .................... 320/163
See application file for complete search history.

(56) References Cited

U.S. PATENT DOCUMENTS

| 5,982,145 | A * | 11/1999 | Eguchi ........................... 320/128 |
| 2001/0028571 | A1 * | 10/2001 | Hanada et al. ................. 363/50 |
| 2003/0054703 | A1 * | 3/2003 | Fischer et al. ................. 439/894 |
| 2009/0174366 | A1 * | 7/2009 | Ahmad et al. ................. 320/114 |

FOREIGN PATENT DOCUMENTS

| CN | 1369944 A | 9/2002 |
| CN | 1960110 A | 5/2007 |
| CN | 2935492 Y | 8/2007 |
| TW | 200803109 A | 1/2008 |
| TW | M346974 U | 12/2008 |
| TW | 200924364 A | 6/2009 |

* cited by examiner

*Primary Examiner* — Arun Williams
(74) *Attorney, Agent, or Firm* — Altis Law Group, Inc.

(57) ABSTRACT

A universal serial bus battery includes a universal serial bus interface, a battery, a charger, a comparator, a first switch, and a second switch. The comparator is configured for comparing the voltage at the universal serial bus interface and the voltage of the battery, and to produce an ON signal when the voltage at the serial bus interface exceeds the voltage of the battery, or to produce an OFF signal otherwise. The first switch is configured for establishing an electrical connection between the USB interface and the charger upon receiving the ON signal or cutting off the connection upon receiving the OFF signal. The second switch is configured for establishing a connection between the universal serial bus interface and the battery when the connection between the USB interface and the charger is terminated by the first switch.

3 Claims, 1 Drawing Sheet

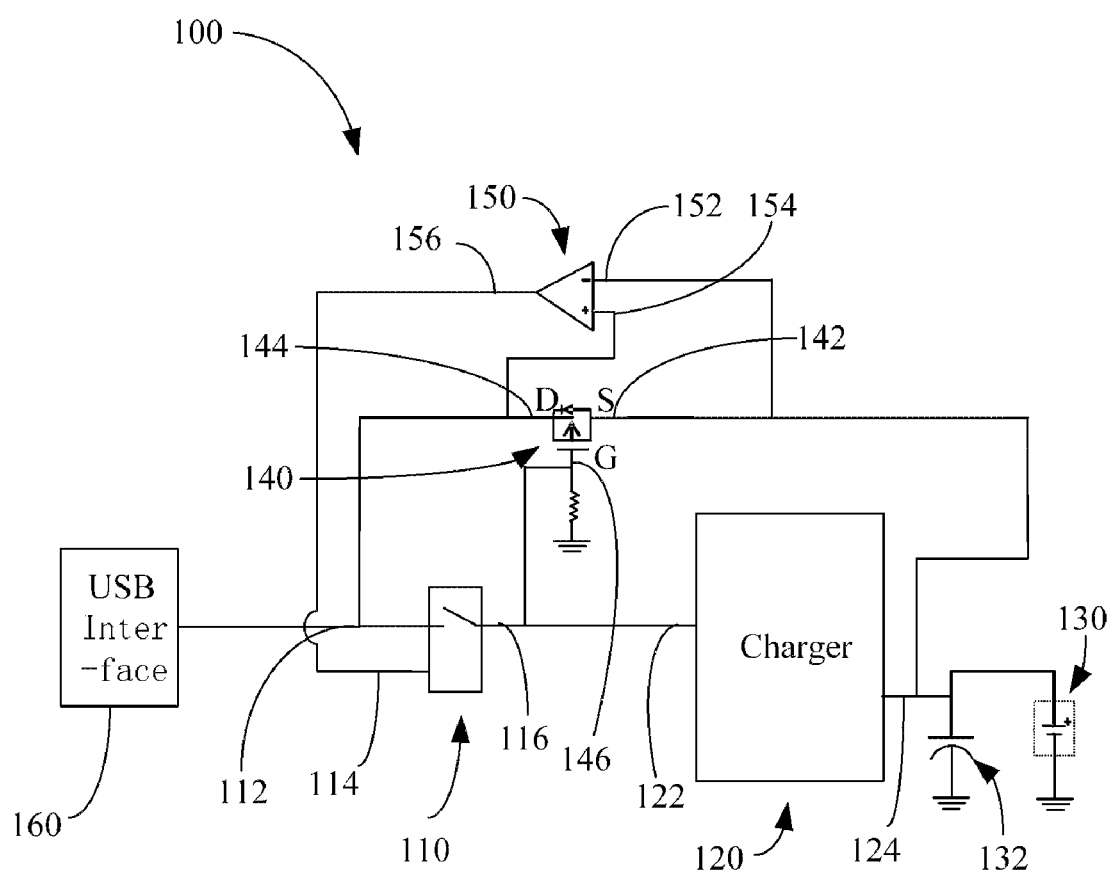

BATTERY HAVING UNIVERSAL SERIAL BUS PORT

BACKGROUND

1. Technical Field

The disclosure relates to batteries, and more particularly, to a battery for charging battery powered devices via USB port.

2. Description of Related Art

Many battery powered devices include universal serial bus (USB) ports for connecting the devices to other devices, such as hosts, USB powered hubs and bus powered hubs, for communication and/or recharging. Many battery powered devices have dedicated batteries built therein. The batteries are generally different in volume and shape from each other and the battery used in one device may not be suitable for another. As a result, a variety of batteries and chargers must be maintained, which is inconvenient and costly.

What is needed is a battery chargeable that can overcome the aforementioned problem.

BRIEF DESCRIPTION OF THE DRAWING

The FIGURE is a block diagram illustrating a universal serial bus battery according to one embodiment.

DETAILED DESCRIPTION

Referring to the FIGURE, a universal serial bus (USB) battery 100 of one embodiment is shown. The USB battery 100 includes a first switch 110, a charger 120, a battery 130, a second switch 140, a comparator 150, and a USB interface 160.

The first switch 110 includes an input terminal 112, a control terminal 114 and an output terminal 116. The input terminal 112 of the first switch 110 is electrically connected to the USB interface 160, to electrically connect to a power supply device (not shown) such as a laptop. The control terminal 114 of the first switch 110 is electrically connected to the comparator 150 for receiving control signals from the comparator 150, to establish or terminate the electrical connection between the input terminal 112 and the output terminal 116 of the first switch 110. The output terminal 116 of the first switch 110 is electrically connected to the charger 120 and the second switch 140.

The charger 120 includes an input terminal 122 and an output terminal 124. The input terminal 122 of the charger 120 is electrically connected to the output terminal 116 of the first switch 110. The output terminal 124 of the charger 120 is electrically connected to the battery 130 for charging the battery 130.

The battery 130 is electrically connected to the output terminal 124 via a positive electrode thereof, and to ground via a negative electrode thereof. In addition, the USB battery 100 further includes a capacitor 132 connected in parallel to the battery 130, to prevent overcharging.

The second switch 140 includes an input terminal 142, an output terminal 144, and a control terminal 146. The input terminal 142 of the second switch 140 is electrically connected to the output terminal 134 of the charger 130. The output terminal 144 of the second switch 140 is electrically connected to the USB interface 160. The control terminal 146 is electrically connected to the output terminal 114 of the first switch 110 to switch the connection between the input terminal 142 and the output terminal 144 of the second switch 140 on and off. The control terminal 146 is also electrically connected to a resistor (not labeled) which is further grounded. In the present embodiment, the second switch 140 is a p-type metal-oxide-semiconductor field-effect transistor (PMOSFET), which includes a source electrode S serving as the input terminal 142 of the second switch 140, a drain electrode D serving as the output terminal 144 of the second switch 140, and a gate electrode G serving as the control terminal 146 of the second switch 140. When a sufficient potential difference, exceeding a threshold voltage value Vsg of the PMOSFET, exists between the source electrode and the gate electrode of the PMOSFET, the source electrode of the PMOSFET and the drain electrode of the PMOSFET are electrically connected to each other. That is, the input terminal 142 and the output terminal 144 of the second switch 140 are electrically connected.

The comparator 150 includes a first input terminal 152, a second input terminal 154, and an output terminal 156. The first input terminal 152 is electrically connected to the input terminal 142 of the second switch 140. The second input terminal 154 of the comparator 150 is electrically connected to the output terminal 144 of the second switch 140. The output terminal 156 of the comparator 150 is electrically connected to the control terminal 114 of the first switch 110. The comparator 150 compares the voltage of the battery 130 and the voltage at the USB interface 160. When the voltage of the battery 130 exceeds that at the USB interface 160, the comparator 150 sends an ON signal to the control terminal 116 of the first switch 110 to switch on the first switch 110, so that power is supplied from the battery to the USB interface 160. When the voltage of the battery 130 is lower than the voltage at the USB interface 160, the comparator 150 sends an OFF signal to the control terminal 116 of the first switch 110 to switch off the first switch 110.

The USB interface 160 is configured to connect to a power supply device for receiving power therefrom, or to a battery powered device with USB port for supplying power thereto.

In use, the USB interface 160 of the USB battery 100 may be plugged into a USB port of a device. The comparator 150 compares the voltage of the battery 130 and the voltage at the USB interface 160 and sends an ON signal to the control terminal 114 of the first switch 110 if the voltage of the battery 130 is lower than the voltage at the USB interface 160. The first switch 110 is switched on by the signal and power is supplied from the USB interface 160 to charge the battery 130 via the charger 120. The second switch 140 is switched off for the potential difference between the input terminal 142 and the control terminal 146 is lower than the threshold voltage Vsg of the second switch 140. The comparator 150 sends an OFF signal to the control terminal 114 of the first switch 110 to switch off the first switch 110 if the voltage of the battery 130 exceeds the voltage at the USB interface 160. The second switch 140 is switched on when the potential difference between the input terminal 142 and the control terminal 146 becomes higher than the threshold voltage Vsg. Correspondingly, the power is supplied from the battery 130 to the USB interface 160. Therefore, the USB battery 100 is capable of receiving power from a device, such as a laptop to charge itself, and providing power to the device when the device loses its own power supply.

As disclosed, the USB interface 160 conveniently receives power from any USB equipped device, and can also provide power to battery powered devices via the USB interface 160.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A universal serial bus battery, comprising:
   a universal serial bus (USB) interface;
   a charger comprising a first input terminal and a first output terminal;
   a battery comprising a positive electrode directly connected to the first output terminal of the charger and a negative electrode connected to ground;
   a comparator comparing a voltage at the universal serial bus interface and a voltage of the battery, the comparator producing a switch on signal when the voltage at the serial bus interface exceeds the voltage of the battery, the comparator further producing a switch off signal when the voltage at the universal serial bus interface does not exceed the voltage of the battery;
   a first switch comprising a second input terminal directly connected to the USB interface and a second output terminal directly connected to the first input terminal of the charge, and configured to establish an electrical connection between the USB interface and the charger upon receiving the switch on signal and cutting off the electrical connection upon receiving the switch off signal;
   a second switch comprising an input terminal electrically connected to the battery, an output terminal electrically connected to the universal serial bus interface, and a control terminal grounded via a resistor and electrically connected to the second output terminal of the first switch, the control terminal establishing an electrical connection between the universal serial bus interface and the battery when the electrical connection between the USB interface and the charger is terminated by the first switch.

2. The universal serial bus battery of claim 1, wherein the second switch is a p-type metal-oxide-semiconductor field-effect transistor (PMOSFET), which comprises a source electrode, a drain electrode, and a gate electrode, the source electrode is the input terminal of the second switch, the drain electrode is the output terminal of the second switch, and the gate electrode is the control terminal of the second switch.

3. The universal serial bus battery of claim 1, further includes a capacitor connected in parallel to the battery.

* * * * *